(12) United States Patent
Schmieder et al.

(10) Patent No.: US 6,391,470 B1
(45) Date of Patent: May 21, 2002

(54) METHOD FOR MANUFACTURING A CROSSBEAM, AND SUCH A CROSSBEAM

(75) Inventors: Hansjörg Schmieder, Oberkirch-Zusenhofen; Hans Merkle, Endingen, both of (DE)

(73) Assignee: Progress-Werk Oberkirch AG, Oberkirch (DE)

( * ) Notice: Subject to any disclaimer, the term of this patent is extended or adjusted under 35 U.S.C. 154(b) by 0 days.

(21) Appl. No.: 09/409,532

(22) Filed: Sep. 30, 1999

(30) Foreign Application Priority Data

Oct. 1, 1998 (DE) .......................... 198 45 146

(51) Int. Cl.⁷ .............................. B21D 47/01
(52) U.S. Cl. ................. 428/598; 428/586; 280/779; 296/72; 29/897.2; 29/897; 29/462; 29/525.01; 29/525.13; 29/525.14
(58) Field of Search .................. 428/598, 586; 280/779; 296/72; 29/897, 897.2, 428, 462, 525.01, 525.13, 525.14

(56) References Cited

U.S. PATENT DOCUMENTS

| | | | |
|---|---|---|---|
| 2,910,314 A | 10/1959 | Klein | |
| 4,362,319 A | * 12/1982 | Masaki et al. | |
| 4,432,565 A | 2/1984 | Suzuki et al. | |
| 5,295,708 A | 3/1994 | Siga et al. | |
| 6,092,840 A | * 7/2000 | Sugawara | |

FOREIGN PATENT DOCUMENTS

| | | |
|---|---|---|
| DE | 2943773 B1 | 3/1981 |
| DE | 4232846 A1 | 3/1994 |
| JP | 08183478 | 7/1996 |

* cited by examiner

*Primary Examiner*—Deborah Jones
*Assistant Examiner*—Wendy Boss
(74) *Attorney, Agent, or Firm*—Harness, Dickey & Pierce, P.L.C.

(57) ABSTRACT

In a method for manufacturing a crossmember for stiffening an instrument panel of a motor vehicle, the crossmember that is to be manufactured having at least two profiled segments, with cross sections differing from one another, arranged in axial prolongation, the smaller-cross-section profiled segment is arranged so as to overlap the larger-cross-section profiled segment over at least a partial length; and in the overlap region, the profiled segments are joined to one another in at least one direction perpendicular to the longitudinal direction by way of at least one stabilizing joining element.

30 Claims, 6 Drawing Sheets

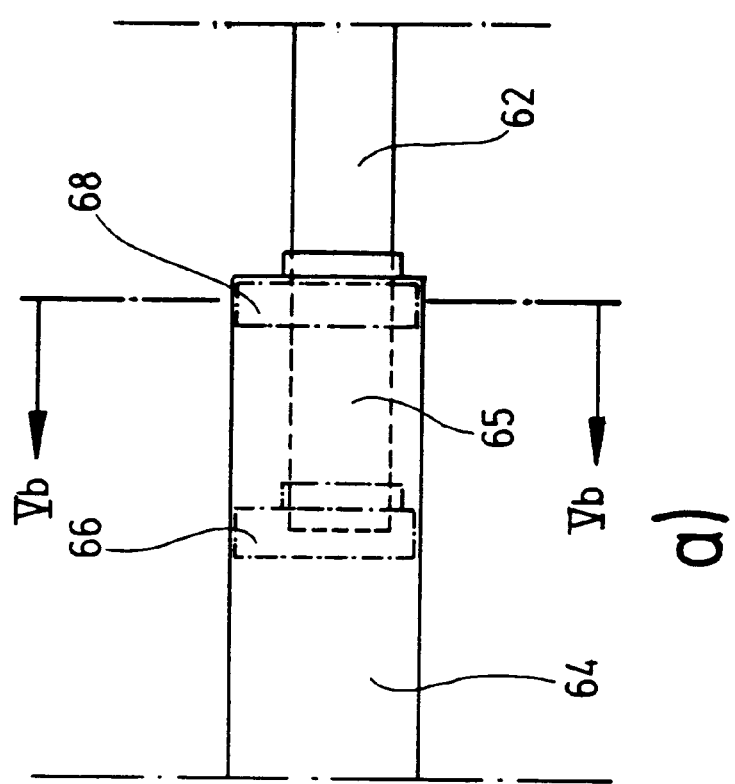
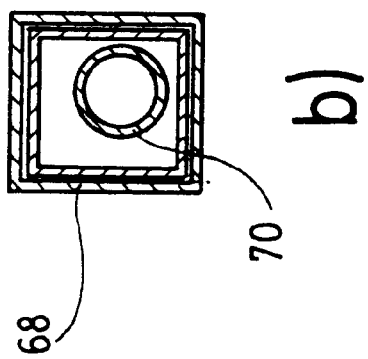
Fig. 5

METHOD FOR MANUFACTURING A CROSSBEAM, AND SUCH A CROSSBEAM

BACKGROUND OF THE INVENTION

The present invention relates to a method for manufacturing a crossbeam for stiffening an instrument panel of a motor vehicle, the crossbeam that is to be manufactured having at least two profiled portions, with cross sections differing from one another, arranged in axial prolongation.

The invention further concerns such a crossbeam.

A method of this kind, and such a crossbeam, are commonly known.

Crossbeams are used in the automotive industry in body design. As part of a motor vehicle body, the crossbeam is arranged so as to extend approximately horizontally in the region below the windshield between the so-called A-pillars. The purpose of the crossbeam is to strengthen the instrument panel. The crossbeam also has the task of stiffening the instrument panel, which is usually made of plastic or wooden parts. Mounts, to which the instrument panel (and also possibly a center console and the steering apparatus) are attached, are provided on the crossbeam.

Crossbeams for stiffening the instrument panel of a motor vehicle are usually manufactured with a profile cross section that is not uniform over the length of the crossbeam. In other words, crossbeams of this kind have at least two profiled portions, arranged in axial prolongation, which have profile cross sections that differ from one another. One of the profiled portions has a smaller cross section, while the other profiled portion possesses a larger cross section. For example, a crossbeam of this kind is configured so that it has one smaller-cross-section profiled portion in the form of a tubular profile, and one larger-cross-section profiled portion in the form of a box profile.

A change of this kind in the cross section or diameter of the crossbeam is necessary in order to shift the resonant frequency of the crossbeam in such a way as to prevent resonances of the crossbeam, and thus vibrations that may be transmitted in particular into the steering apparatus, over the entire speed range of the motor vehicle.

Another reason for manufacturing crossbeams of this kind with a non-constant cross section is that because of the wiring running in the instrument panel for the instruments, and the instruments themselves, the space available in the instrument panel is sometimes limited.

At present, crossbeams having profiled portions with different cross sections are manufactured by expanding the smaller-cross-section profiled portion, by internal high-pressure forming, to the cross section of the larger-cross-section profiled portion. Depending on the shape of the profiled portions, which can be different, a method of this kind, in which the smaller-cross-section profiled portion is expanded to the cross section of the larger-cross-section profiled portion, is very cost-intensive and sometimes also time-consuming.

Another kind of method for manufacturing a crossbeam of this kind consists in spanning the discontinuity in cross section between the profiled portion using drawn parts manufactured with the deep-drawing process, which are arranged in the longitudinal direction between the profiled portions that are spaced apart from one another in the longitudinal direction and are joined at the ends to the two profiled portions. The fabrication of drawn parts is also, however, time-consuming and cost-intensive.

It is usual in the development of motor vehicle bodies, in order to discover the crossbeam having the requisite properties that are suitable for the particular motor vehicle model by trying out different profile shapes, to perform test series in which a plurality of crossbeams with various profiles must be manufactured. The conventional method for manufacturing crossbeams is not suitable for such test series, however, because of its high cost and expenditure of time.

It is therefore the object of the invention to develop a method and a crossbeam of the kind cited initially in such a way that the crossbeam can be manufactured with little cost and little expenditure of time.

SUMMARY OF THE INVENTION

According to the present invention, this object is achieved, in terms of the method cited initially, in that the smaller-cross-section profiled portion is arranged so as to overlap the larger-cross-section profiled portion over at least a partial length, and that in the overlap region, the profiled portions are joined to one another in at least one direction perpendicular to the longitudinal direction by way of at least one rigid joining element.

This object is correspondingly achieved, in terms of the crossbeam cited initially, in that the smaller-cross-section profiled portion is arranged so as to overlap the larger-cross-section profiled portion over at least a partial length, and that in the overlap region, the profiled portions are joined to one another in at least one direction perpendicular to the longitudinal direction by way of at least one rigid joining element.

The method and the crossbeam according to the present invention differ from the known crossbeams, in which the discontinuity in cross section is spanned by forming methods, in that the two profiled portions of differing cross sections at least partially overlap one another, and are joined to one another in the overlap region by a rigid joining element. With this manufacturing method according to the present invention, it is advantageously possible to manufacture crossbeams in economical fashion from a wide variety of profile cross sections and profile shapes. With the procedure according to the present invention for joining the profiled portions to one another, any abrupt changes in profile cross sections can be spanned. The method according to the present invention is economical and time-saving, since it is possible to dispense with the manufacture of complex stamped or drawn parts. Because of the low cost and time expenditure, the method according to the present invention is particularly suitable for the manufacture of a plurality of crossbeams of different profile shapes in a test series. The manner according to the present invention of joining the profiled portions using at least one rigid joining element running in at least one direction perpendicular to the longitudinal direction makes it possible, despite the simplification of the manufacturing process and the simplification of the structure of the crossbeam, to advantageously avoid losses in the flexural stiffness of the crossbeam.

The object of the invention is thereby completely achieved.

In a preferred embodiment of the method, the smaller-cross-section profiled portion is introduced at least partially into the larger-cross-section profiled portion, and is then joined to the larger-cross-section profiled portion by way of the at least one joining element.

It is advantageous in this context that the crossbeam according to the present invention can continue to be as compact as possible in a direction perpendicular to the longitudinal direction of the crossbeam, since because the smaller-cross-section profiled portion penetrates into the larger-cross-section profiled portion, the larger-cross-section profiled portion determines the maximum extension of the crossbeam in a direction perpendicular to the longitudinal direction.

In a further preferred embodiment of the method, the profiled portions are made from steel, the profiled portions then being joined to one another by way of at least one joining element, in the form of a sheet piling, a web plate, or a profile element, that is directly joined to the profiled portions by welding, soldering, adhesive bonding, or the like.

In this situation in which the profiled portions are made from steel, the aforementioned joining elements can also be manufactured in particularly economical fashion from steel as geometrically simple elements, by cutting, bending, etc. The use of the same material for both the profiled portions and the joining element or elements has the advantage that the joining elements can be directly joined to the profiled portions by welding.

In a further preferred embodiment, the profiled portions are made from a lightweight metal, in particular aluminum or an aluminum or magnesium alloy, the profiled portions then being joined to one another by way of at least one joining element, in the form of an extruded profile, a sheet piling, a web plate, or a profile element, that is directly joined to the profiled portions by welding, soldering, adhesive bonding, or the like.

The method according to the present invention can advantageously also be used in the situation in which the crossbeam is produced by lightweight construction from lightweight metal, e.g. from aluminum, by the fact that the aluminum joining element or elements are also configured from aluminum, advantageously in the form of extruded profiles that can be manufactured economically and configured with suitable profile shapes, and that ensure a flexurally stiff join between the profiled portions.

In a further preferred embodiment, at least one slot, into which at least one joining element is inserted, is introduced into the larger-cross-section profiled portion and/or into the smaller-cross-section profiled portion.

It is advantageous in this context that the joining element that is arranged, in accordance with the above preferred configuration, partially in the cavity of the larger-cross-section profiled portion, can be welded in easily handled fashion to the larger-cross-section profiled portion, since the weld bead can be applied from outside in the region of the slot or slots.

In a further preferred embodiment of the crossbeam manufactured in this fashion, the smaller-cross-section profiled portion is a tubular profile, and the larger-cross-section profiled portion is a box profile with a rectangular, trapezoidal, triangular, or similar cross section.

As already mentioned, it is possible with the method according to the present invention to economically manufacture any desired crossbeams that have at least two profiled portions with different cross sections, i.e. with different cross-sectional shapes and/or different cross-sectional sizes. It is thus possible, at little cost and with equally little time expenditure, to manufacture a series of crossbeams for a test series in order to investigate the suitability and properties of different profile shapes.

In a further preferred embodiment of the crossbeam, at least one joining element is configured as a sleeve which has an opening through which the tubular profile is passed and whose outer contour is adapted to the inner contour of the box profile.

With this configuration of the joining element, it is particularly advantageous that the smaller-cross-section profiled portion, i.e. the tubular profile, experiences support on all sides in the larger-cross-section profiled portion, i.e. in the box profile, thus resulting in a particularly stable, flexurally stiff join between the two profiled portions.

In a further preferred embodiment of the crossbeam according to the present invention, at least one joining element is configured as a tubular profiled piece that is joined with one surface line to the tubular profile and joined with at least one further surface line to the box profile.

This configuration of the at least one joining element is particularly advantageous because the tubular profiled piece can be cut to length from the tubular profile that forms the smaller-cross-section profiled portion and that can be manufactured as cut goods, so that separate fabrication of joining elements can be entirely dispensed with. It is thereby possible to minimize cost in the manufacture of the cross, 9beam. A flexurally stiff join between the two profiled portions is reliably achieved with this configuration of the joining element as well.

In a further particularly preferred embodiment of the method and of the crossbeam the larger-cross-section profiled portion is manufactured together with the at least one joining element in one piece in form of an extruded profile. In this case the one or plural joining elements are integral with the larger-cross-section profiled portion.

The particular advantage of this embodiment is that the manufacturing method is further simplified, because one method step is dispensed with, namely joining of the joining element or joining elements to the larger-cross-section profiled portion. On the other hand, the stability and mechanical resistance of the larger-cross-section profiled portion is improved, because predetermined breaking points like weldment joints are avoided.

Further advantages and features are evident from the description below and from the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Selected exemplifying embodiments that show some of the possible variant configurations of the method and the crossbeam a according to the present invention are shown in the drawings and will be described hereinafter in more detail with reference to the drawings, in which:

FIGS. 5a) through b) show schematic views of a portion of a crossbeam in detail in accordance with a further exemplifying embodiment, FIG. 5a) being a side view and FIG. 5b) a section along line Vb—Vb in FIG. 5a);

DETAILED DESCRIPTION OF PREFERRED EMBODIMENTS

Figure 1:
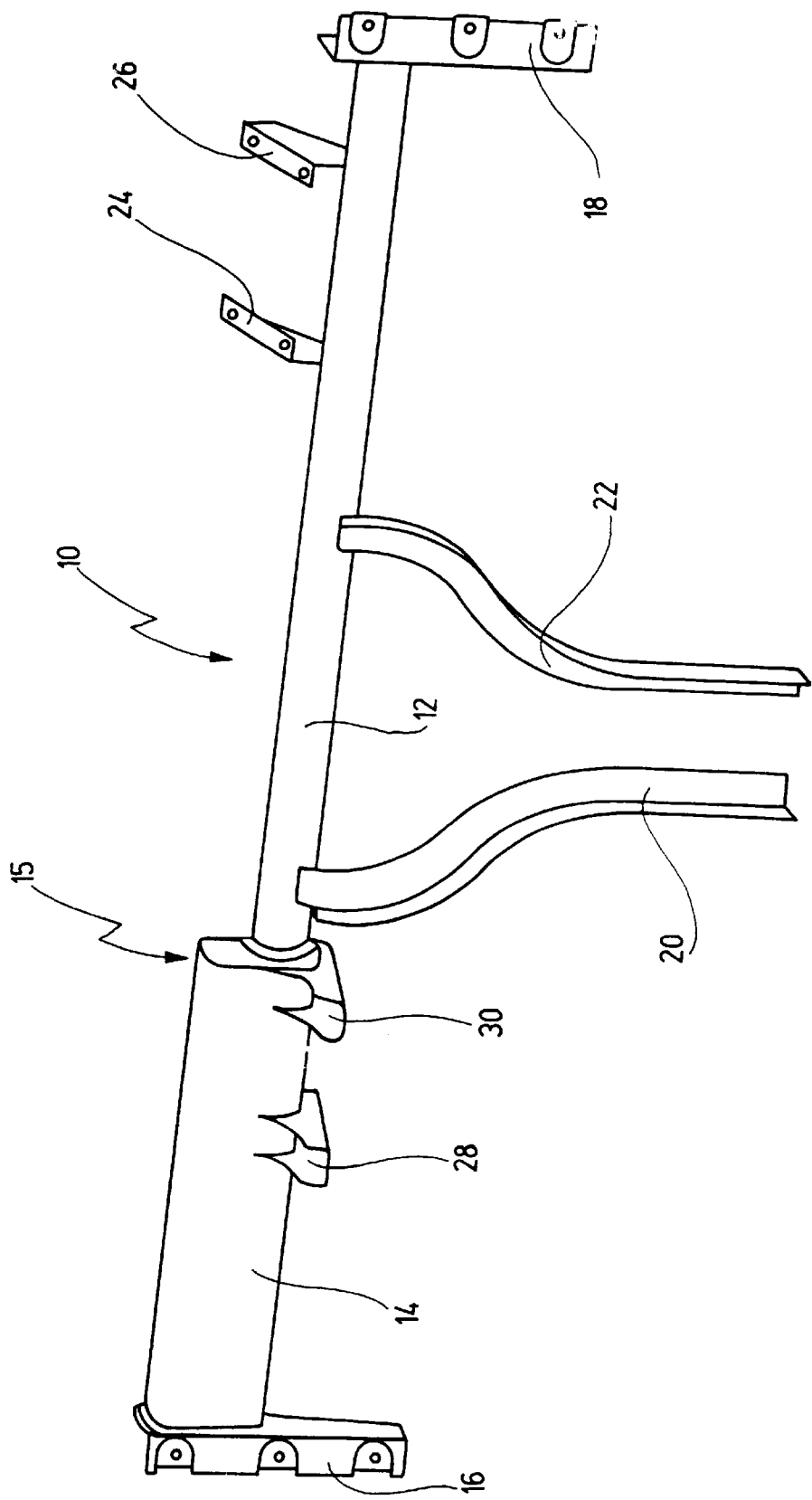
FIG. 1 shows a crossbeam manufactured and configured according to the present invention, in a schematic overall perspective view.

FIG. 1 shows a crossbeam, labeled with the general reference numeral 10, in an overall perspective view.

Crossbeam 10 serves, in a motor vehicle (not shown), to stiffen an instrument panel (also not shown). Crossbeam 10 is part of the vehicle body, and is arranged in the region below the windshield between the vertically extending A-pillars.

Crossbeam 10 has a first profiled portion 12 and a second profiled portion 14. First profiled portion 12 is constituted by a tubular profile with a round cross section. Second profiled portion 14 is constituted by a box profile, second profiled portion 14, as is evident from FIG. 1, having a larger cross section than first profiled portion 12. Second profiled portion 14 in the form of the box profile is also configured as a hollow profile. In a region 15, there exists a discontinuity in terms of the cross sections of first profiled portion 12 and second profiled portion 14.

In the exemplifying embodiment, the two profiled portions 12 and 14 individually each have a cross section that is substantially uniform over its length. First profiled portion 12 and second profiled portion 14 are arranged, in axial prolongation of one another, in the longitudinal direction of the crossbeam.

Crossbeam 10 furthermore has lateral mounts 16 and 18 with which crossbeam 10 is attached to the aforementioned A-pillars of the vehicle frame. Also provided are center mounts 20 and 22 on crossbeam 10 which are used for attachment to a center console (tunnel) of the motor vehicle. Further mounts 24 and 26 are provided on crossbeam 10 for attaching a passenger airbag to crossbeam 10. Lastly, mounts 28 and 30, which serve to attach the parts of the motor vehicle's steering apparatus, are attached to second profiled portion 14.

As will be described in further detail hereinafter, smaller-cross-section first profiled portion 12 and larger-cross-section second profiled portion 14 are arranged so as to overlap over at least a partial length. The overlap region can extend over the entire length of larger-cross-section second profiled portion 14. At least in the overlap region, profiled portions 12 and 14 are joined to another in at least one direction perpendicular to the longitudinal direction of crossbeam 10 by way of at least one rigid joining element, as will be explained in more detail hereinafter with reference to the exemplifying embodiments shown in FIGS. 2 through 9.

FIGS. 2a) through c) partially depict a further crossbeam which has a smaller-cross-section first profiled portion 32 and a larger-cross-section second profiled portion 34. Smaller-cross-section first profiled portion 32 is once again configured as a tubular profile, while larger-cross-section second profiled portion 34 is configured as a box profile with an approximately trapezoidal cross section.

Smaller-cross-section first profiled portion 32 is introduced, with an end portion 36 that is joined integrally to the remaining portion of first profiled portion 32, into second profiled portion 34 over a partial length thereof. In second profiled portion 34, end portion 36 is positioned in a corner so that end portion 36 rests with a first surface line 38 and a second surface line 40 against the inner side of profiled portion 34. End portion 36 is welded to second profiled portion 34 at surface lines 38 and 40. To facilitate the welding of end portion 36 onto second profiled portion 34, the box profile of second profiled portion 34 can be of slotted configuration in the region of surface line 38 and surface line 40.

First profiled portion 32 is furthermore joined to second profiled portion 34, in this case in two directions perpendicular to the longitudinal direction of profiled portion 32 and of profiled portion 34, by way of a rigid joining element 42.

Joining element 42 is configured in the form of a web plate bent at an angle. At a contact line 44 between joining element 42 and end portion 36 of first profiled portion 32, the two parts are welded to one another. End portions of joining element 42 are inserted into slots 46 and 48 of second profiled portion 34, and there welded to second profiled portion 34.

In addition, second profiled portion 34 is closed off, at an end face facing toward profiled portion 32, by a cover 50 that also contributes to the flexurally stiff join between first profiled portion 32 and second profiled portion 34. Cover 50 is configured as a sleeve which has an opening 52 through which end portion 36 of first profiled portion 32 is passed. Cover 50 rests against the end face of second profiled portion 34 and can be welded thereto; a groove can additionally be provided internally in cover 50 for receiving the end face of second profiled portion 34.

In order to join first profiled portion 32 to second profiled portion 34, first of all joining element 42 is welded onto end portion 36 of first profiled portion 32. The arrangement made up of end portion 36 and joining element 42 joined thereto is then inserted into second profiled portion 34 over the desired partial length, after which the free ends of joining element 42 can be welded to second profiled portion 34 from outside through slots 46 and 48. Cover 50, which was slid onto first profiled portion 32 before joining element 42 was joined to end portion 36, can then be immovably joined to the end face of second profiled portion 34.

In this exemplifying embodiment, first profiled portion 32, second profiled portion 34, and joining element 42 are made from steel.

The exemplifying embodiment shown in FIGS. 3a) through c) is modified, as compared to the previous exemplifying embodiment, in that first profiled portion 32 is joined to second profiled portion 34 by way of a joining element 54, joining element 54 not only extending over the actual overlap region between end portion 36 of first profiled portion 32 and second profiled portion 34, but also projecting out of second profiled portion 34. An end portion 56 of joining element 54 is configured in outwardly tapering fashion.

The flexural stiffness of the join between first profiled portion 32 and second profiled portion 34 is improved by the fact that joining part 54 extends over a longer portion of first profiled portion 32. In this exemplifying embodiment, end cover 50 as shown in FIG. 2 is omitted because of the configuration of joining element 54.

Figure 2:
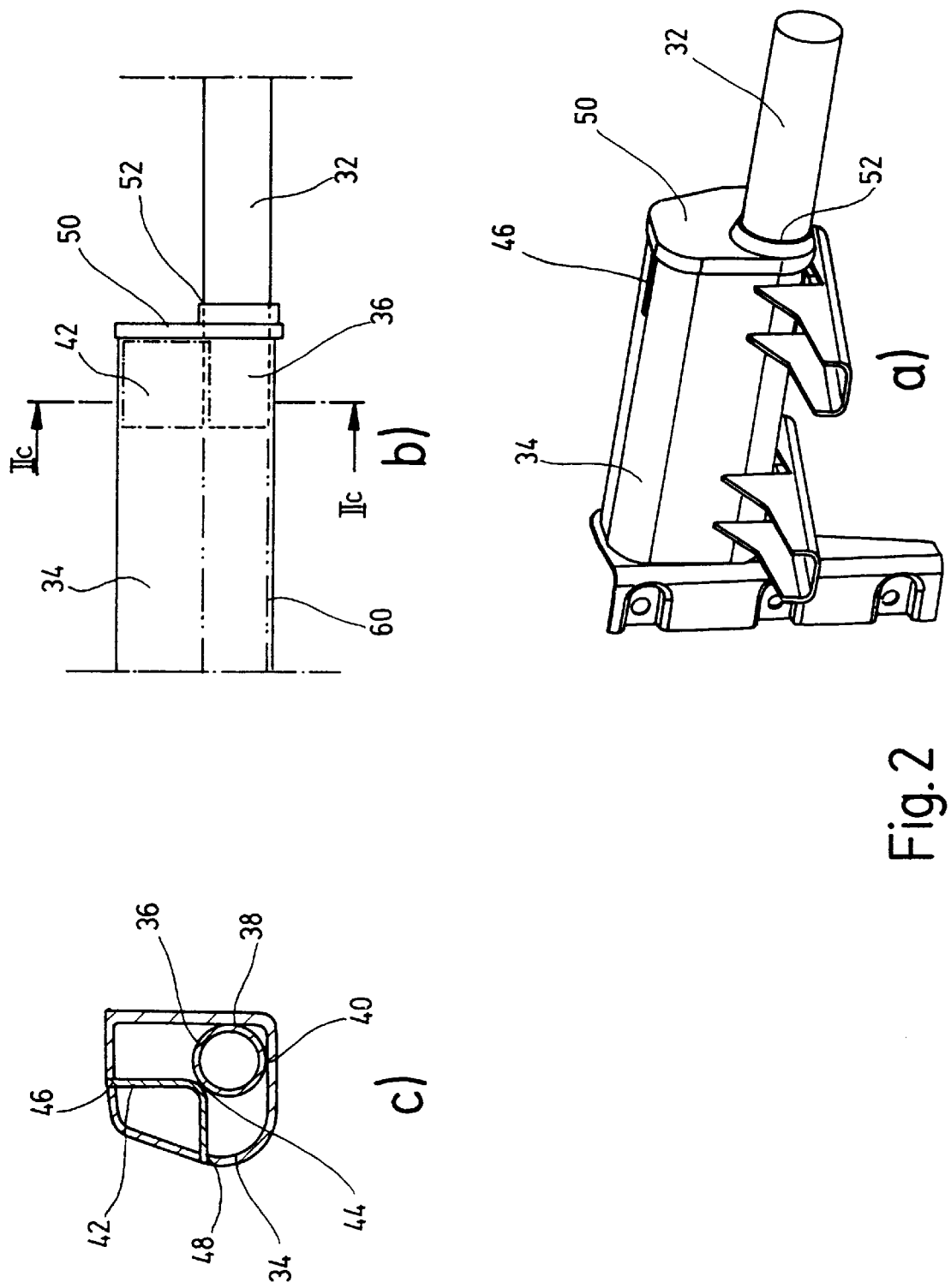
FIGS. 2a) through c) show representations of a portion of a crossbeam in detail in accordance with one exemplifying embodiment, FIG. 2a) being a perspective view, FIG. 2b) a side view, and FIG. 2c) a section along line IIc—IIc in FIG. 2b)
Figure 3:
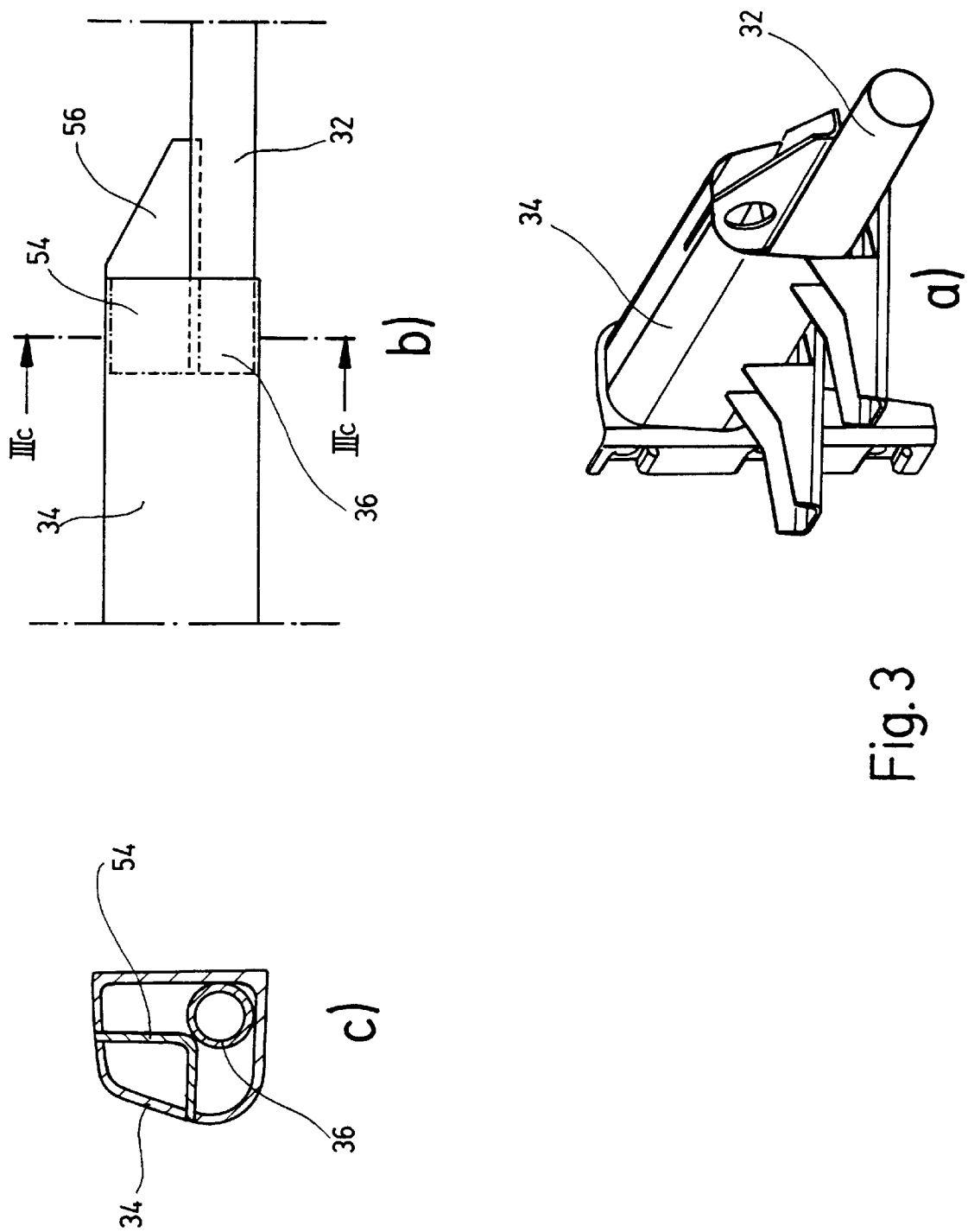
FIGS. 3a) through c) show representations of a portion of a crossbeam in detail in accordance with a further exemplifying embodiment, FIG. 3a) being a perspective view, FIG. 3b) a side view, and FIG. 3c) a section along line IIIc—IIIc in FIG. 3b)

A further, particularly favorable variant of the two previous exemplifying embodiments according to FIGS. 2 and 3 is shown in FIGS. 4a) through c). In this exemplifying embodiment, the join between first profiled portion 32 and second profiled portion 34 is constituted by a joining element 58 in the form of a tubular profiled piece. This tubular profiled piece can be cut to length from first profiled portion 32 that is usually manufactured as cut goods during manufacture of a crossbeam, so that joining element 58 can be manufactured in particularly economical fashion.

As further shown in FIG. 2b) with double-dotted broken lines, first profiled portion 32 can also be introduced into second profiled portion 34 with a greater overlap length therewith, in order to achieve higher flexural stiffness. This can also be provided for in the exemplifying embodiments in accordance with FIGS. 3 and 4. Joining parts 42 in FIG. 2, 54 in FIG. 3, and 58 in FIG. 4 can also be made longer, for example can extend through the entirety of second profiled portion 34, or, like joining piece 54 in FIG. 3, can extend out of pro-filed portion 32.

Joining part 58 in the form of the tubular profiled piece is joined to end portion 36 of the first profiled portion at a surface line 59, and to the inner side of second profiled portion 34 at two further surface lines 61 and 63.

FIGS. 5a and b) depict the fact that with the method according to the present invention, it is also possible for a first profiled portion 62 in the form of a smaller-cross-section tubular profile to be joined in flexurally stiff fashion to a second profiled portion 64 in the form of a larger-cross-section rectangular profile.

For this purpose, an end portion 65 of first profiled portion 62 is once again introduced into second profiled portion 64. The join between first profiled portion 62 and second profiled portion 64 is brought about by way of joining elements 66 and 68 that are configured in the form of sleeves.

These sleeves have a continuous opening 70 through which end portion 65 of first profiled portion 62 is passed. Opening 70 is adapted to the outer contour of first profiled portion 62. In the exemplifying embodiment shown, the configuration of opening 70 is thus round, so that end portion 65 rests conformingly in opening 70 and is directly joined therein to joining elements 66 and 68.

An outer contour of joining parts 66 and 68, on the other hand, is adapted to the inner contour of second profiled portion 64, which is rectangular in the exemplifying embodiment that is shown, so that joining parts 66 and 68 rest on all sides against the inner wall of second profiled portion 64 and can be directly joined thereto, for example by welding.

Opening 70 can be arranged in joining elements 66 and 68 in such a way that first profiled portion 62 runs coaxially with the longitudinal center axis of second profiled portion 64, but the opening can also be positioned so as to make possible an eccentric arrangement between first profiled portion 62 and second profiled portion 64, as shown in FIG. 5b).

Figure 4:
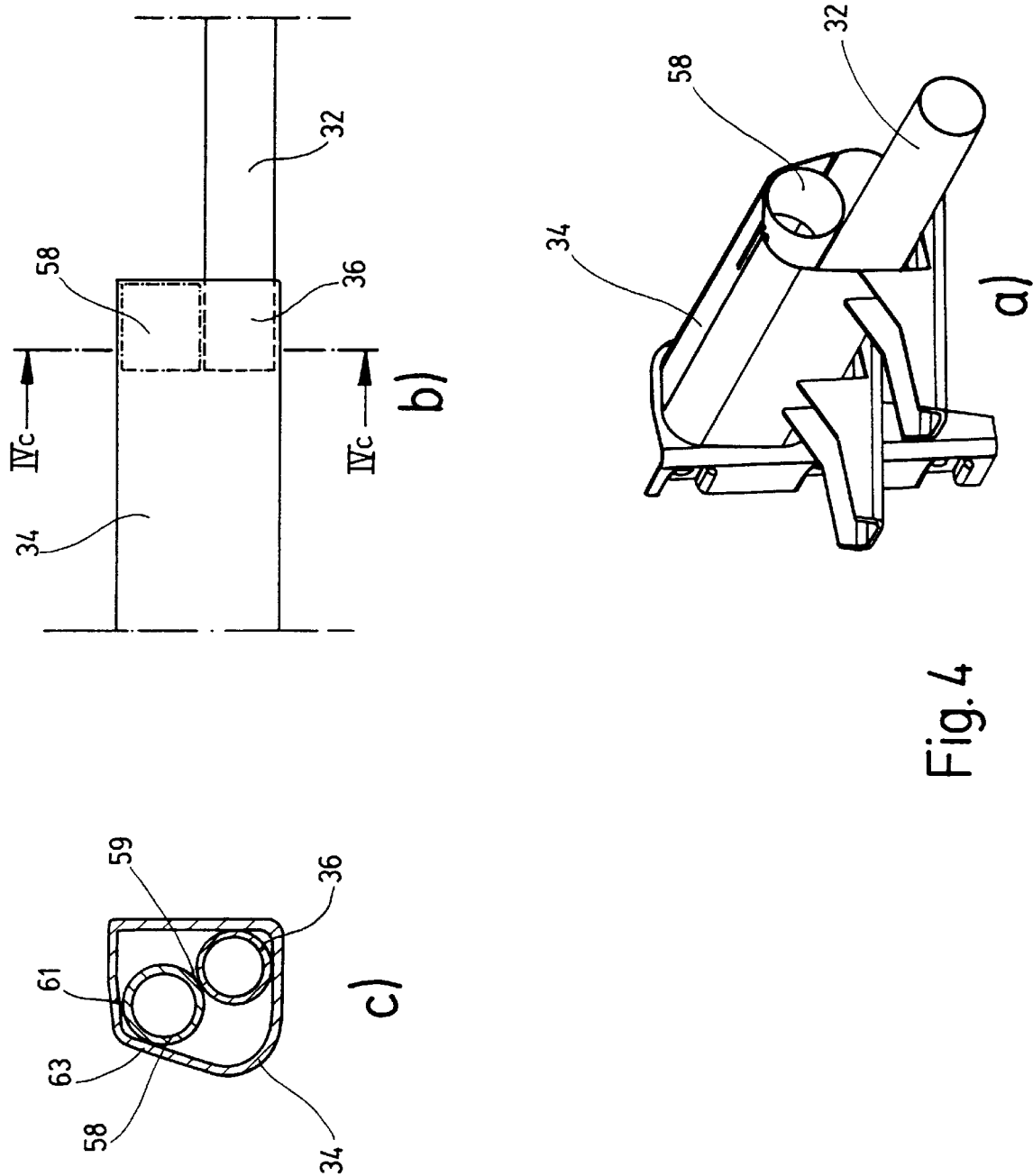
FIGS. 4a) through c) show representations of a portion of a crossbeam in detail in accordance with a further exemplifying embodiment, FIG. 4a) being a perspective view, FIG. 4b) a side view, and FIG. 4c) a section along line IVc—IVc in FIG. 4b)
Figure 6:
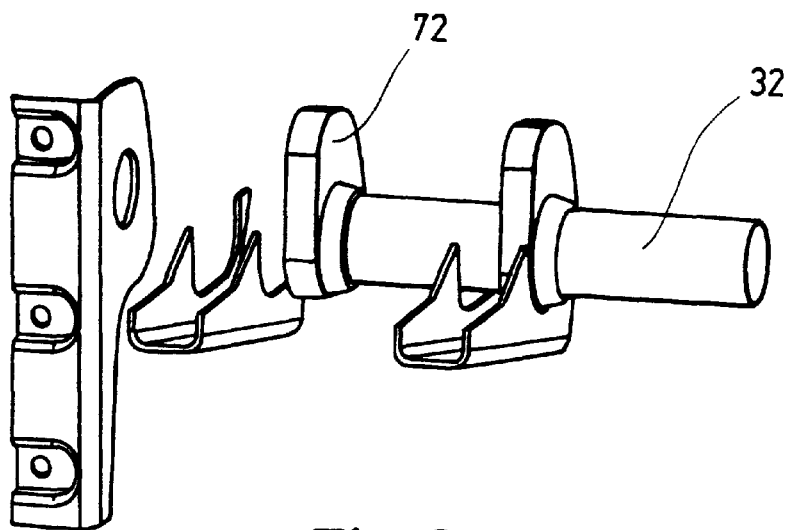
FIG. 6 shows a perspective representation of a portion of a crossbeam in accordance with a further exemplifying embodiment, the larger-cross-section profiled portion being omitted for the sake of clarity.

FIG. 6 shows, as a further variant of the exemplifying embodiments in accordance with FIGS. 2 through 4, that first profiled portion 32 in the form of the tubular profile can also be joined by way of joining parts 72 in the form of sleeves, in a manner similar to the exemplifying embodiment in FIG. 5, to second profiled portion 34 (not shown in FIG. 6) in the form of the trapezoidal box profile; joining elements 72 can accordingly have a trapezoidal outer contour that corresponds to the trapezoidal inner contour of second profiled portion 34.

Figure 7:
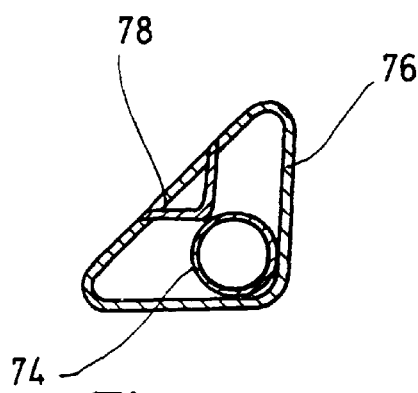
FIGS. 7 through 9 show cross-sectional representations, corresponding to FIGS. 2c), 3c), and 4c) respectively, of crossbeams in accordance with further exemplifying embodiments.
Figure 8:
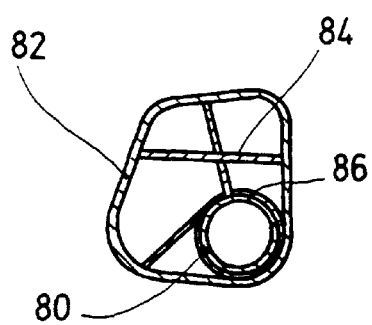
Figure 9:
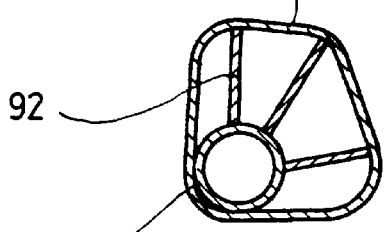

Lastly, FIGS. 7 through 9 depict further exemplifying embodiments that indicate possible ways of joining profiled portions with different cross sections, i.e. different cross-sectional sizes and/or different cross-sectional shapes, in order to manufacture crossbeams.

In FIG. 7, a first profiled portion 74 with a round cross section, in the form of a tubular profile., is joined to a second profiled portion 76 with a triangular cross section, in the form of a box profile, by way of a joining element 78 in the form of a web plate bent at approximately a right angle.

FIG. 8 shows an exemplifying embodiment that is suitable in particular for manufacturing a crossbeam from a lightweight metal such as aluminum. A first profiled portion 80 made of aluminum with a round cross section is joined to a second profiled portion 82, in overlapping fashion as in the previous exemplifying embodiments. A joining element 84 in the form of an extruded profile is used for flexurally stiff joining of first profiled portion 80 to second profiled portion 82, which is also made from aluminum. Joining element 84 configured as an extruded profile, which is also made from aluminum, has a cylindrical portion 86 that is joined conformingly and directly to first profiled portion 80. Joining element 84 moreover has webs, extending in several directions perpendicular to the longitudinal direction of profiled portions 80 and 84, that guarantee a flexurally stiff join even when the crossbeam is made from aluminum.

It is particularly advantageous if joining element 84 and profiled portion 82 are manufactured as one piece in only one manufacturing process in form of an extruded profile so that in this case this one-piece extruded profile is joined with profiled portion 80.

The afore mentioned procedure of manufacturing the at least one joining element and the larger-cross-section profiled portion as one piece in form of an extruded profile can also be applied to the embodiments according to FIG. 1 through 7 and to the following embodiment according to FIG. 9 if a suitable material, like aluminum, is chosen for these parts.

Lastly, FIG. 9 shows one final exemplifying embodiment in which a first profiled portion 88 is joined to a second profiled portion 90 via multiple joining elements 92 that are configured as simple sheet pilings and create stabilizing, flexurally stiff struts between first profiled portion 88 and second profiled portion 90. This embodiment of the join between first profiled portion 88 and second profiled portion 90 is once again particularly suitable for crossbeams that are made entirely from steel.

The exemplifying embodiments described above indicate only a small portion of the possibilities for manufacturing a crossbeam that has different profile cross sections over its length. It is possible with the method according to the present invention to economically manufacture crossbeams from profiled portions with any desired cross-sectional shape or cross-sectional size, with no loss of flexural stiffness in any crossbeam manufactured using the method according to the present invention.

What is claimed is:

1. A method for manufacturing a crossbeam for stiffening an instrument panel of a motor vehicle, said crossbeam that is to be manufactured having at least a first and at least a second profiled portion, said first and second profiled portions being arranged in axial prolongation of each other, said first profiled portion having a cross section smaller than said second profiled portion, wherein said first profiled portion is arranged so as to axially overlap the second profiled portion over at least a partial length, and, in the entire overlap region, said first profiled portion and said second profiled portion are configured such that there is at least partially a gap between an outer circumference of said first profiled portion and an inner circumference of said second profiled portion, wherein in said overlap region said first and second profiled portions are joined to one another in at least one direction perpendicular to the longitudinal direction of said crossbeam by way of at least one rigid joining element spanning said gap between said outer circumference of said first profiled portion and said inner circumference of said second profiled portion.

2. The method of claim 1, wherein said first profiled portion is introduced at least partially into said second profiled portion, and is then joined to said second profiled portion by way of said at least one joining element.

3. The method of claim 1, wherein said first and second profiled portions are made from steel, said profiled portions then being joined to one another by way of said at least one joining element in the form of a sheet piling that is directly joined to said profiled portions by welding, soldering or adhesive bonding.

4. The method of claim 1, wherein said first and second profiled portions are made from steel, said profiled portions then being joined to one another by way of said at least one joining element in the form of a web plate, that is directly joined to said profiled portions by welding, soldering or adhesive bonding.

5. The method of claim 1, wherein said first and second profiled portions are made from steel, said profiled portion then being joined to one another by way of at least one joining element in the form of a profile element that is directly joined to said profiled portions by welding, soldering or adhesive bonding.

6. The method of claim 1, wherein said first and second profiled portions are made from a lightweight metal and said profiled portions are then joined to one another by way of said at least one Joining element in the form of an extruded profile that is directly joined to said profiled portions by welding, soldering or adhesive bonding.

7. The method of claim 6, wherein said lightweight metal is selected from aluminum, an aluminum alloy or a magnesium alloy.

8. The method of claim 1, wherein at least one slot is introduced into said second profiled portion into which said at least one joining element is inserted.

9. The method of claim 1, wherein at least one slot is introduced into said first profiled portion into which said at least one joining element is inserted.

10. The method of claim 1, wherein said second profiled portion is manufactured together with said at least one joining element in one piece in form of an extruded profile.

11. A crossbeam for stiffening an instrument panel of a motor vehicle, comprising at least a first and at least a second profiled portion, said first and second profiled portions being arranged in axial prolongation of each other, said first profiled portion having a cross section smaller than said second profiled portion, wherein said first profiled portion is arranged so as to axially overlap said second profiled portion over at least a partial length, and, in the entire overlap region, said first profiled portion and said second profiled portion are configured such that there is at least partially a gap between an outer circumference of said first profiled portion and an inner circumference of said second profiled portion, wherein in said overlap region said first and second profiled portions are joined to one another in at least one direction perpendicular to the longitudinal direction of said crossbeam by way of at least one rigid joining element spanning said gap between said outer circumference of said first profiled portion and said inner circumference of said second profiled portion.

12. The crossbeam of claim 11, wherein said first profiled portion is introduced at least partially into said second profiled portion, and is joined to said second profiled portion by way of said at least one joining element.

13. The crossbeam of claim 11, wherein said first and second profiled portion are made from steel, said first and second profiled portions then being joined to one another by way of said at least one joining element in the form of a sheet piling.

14. The crossbeam of claim 11, wherein said first and second profiled portions are made from steel, said first and second profiled portions then being joined to one another by way of said at least one joining element in the form of a web plate.

15. The crossbeam of claim 11, wherein said first and second profiled portions are made from steel, said first and second profiled portions then being joined to one another by way of said at least one joining element in the form of a profiled element.

16. The crossbeam of claim 11, wherein said first and second profiled portions are made from a lightweight metal, and said first and second profiled portions are then joined to one another by way of said at least one joining element in the form of an extruded profile.

17. The crossbeam of claim 16, wherein said lightweight metal is selected from aluminum, an-aluminum alloy or a magnesium alloy.

18. The crossbeam of claim 11, wherein at least one slot is introduced into said second profiled portion into which said at least one joining element is inserted.

19. The crossbeam of claim 11, wherein at least one slot is introduced into said first profiled portion into which said at least one joining element is inserted.

20. The crossbeam of claim 11, wherein said first profiled portion is a tubular profile.

21. The crossbeam of claim 11, wherein said second profiled portion is a box profile with a rectangular cross-section.

22. The crossbeam of claim 11, wherein said second profiled portion is a box profile with a trapezoidal cross-section.

23. The crossbeam of claim 11, wherein said second profiled portion is a box profile with a triangular cross-section.

24. The crossbeam of claim 20, wherein said at least one joining element is configured as a sleeve which has an opening through which said tubular profile is passed and whose outer contour is adapted to an inner contour of said second profiled portion.

25. The crossbeam of claim 11, wherein said first profiled portion is a tubular profile, and said second profiled portion is a box profile, and said at least one joining element is configured as a tubular profiled piece that is joined with one surface line to said tubular profile and joined with at least one further surface line to said box profile.

26. The crossbeam of claim 11, wherein said second profiled portion is manufactured together with said at least one joining element in one piece in form of an extruded profile.

27. A method for manufacturing a crossbeam for stiffening an instrument panel of a motor vehicle, said crossbeam that is to be manufactured having at least a first and at least a second profiled portion, said first and second profiled portions being arranged in axial prolongation of each other, said first profiled portion having a cross-section smaller than said second profiled portion, wherein said first profiled portion is arranged so as to axially overlap the second profiled portion over at least a partial length, and, in the overlap region, said first and second profiled portions are joined to one another in at least one direction perpendicular to the longitudinal direction of said crossbeam by way of at least one rigid joining element, and further wherein at least one slot is introduced into said second profiled portion into which said at least one joining element is inserted.

28. A method for manufacturing a crossbeam for stiffening an instrument panel of a motor vehicle, said crossbeam that is to be manufactured having at least a first and at least a second profiled portion, said first and second profiled portions being arranged in axial prolongation of each other, said first profiled portion having a cross-section smaller than said second profiled portion, wherein said first profiled portion is arranged so as to axially overlap the second profiled portion over at least a partial length, and, in the overlap region, said first and second profiled portions are joined to one another in at least one direction perpendicular to the longitudinal direction of said crossbeam by way of at least one rigid joining element, and further at least one slot is introduced into said first profiled portion into which said at least one joining element is inserted.

29. A crossbeam for stiffening an instrument panel of a motor vehicle, comprising at least a first and at least a second profiled portion, said first and second profiled portions being arranged in axial prolongation of each other, said first profiled portion having a cross-section smaller than said second profiled portion, wherein said first profiled portion is arranged so as to axially overlap said second portion over at least a partial length, and, in the overlap region, said first and second profiled portions are joined to one another in at least one direction perpendicular to the longitudinal direction of said crossbeam by way of at least one rigid joining element, and further wherein at least one slot is introduced into said second profiled portion into which said at least one joining element is inserted.

30. A crossbeam for stiffening an instrument panel of a motor vehicle, comprising at least a first and at least a second profiled portion, said first and second profiled portions being arranged in axial prolongation of each other, said first profiled portion having a cross-section smaller than said second profiled portion, wherein said first profiled portion is arranged so as to axially overlap said second portion over at least a partial length, and, in the overlap region, said first and second profiled portions are joined to one another in at least one direction perpendicular to the longitudinal direction of said crossbeam by way of at least one rigid joining element, and further wherein at least one slot is introduced into said first profiled portion into which said at least one joining element is inserted.

\* \* \* \* \*